United States Patent Office 3,084,140
Patented Apr. 2, 1963

3,084,140
POLYHYDROXYURETHANES
Arthur E. Gurgiolo, Wilbur L. Bressler, and John C. Smith, Lake Jackson, Tex., assignors to The Dow Chemical Company, Midland, Mich., a corporation of Delaware
No Drawing. Filed Oct. 31, 1957, Ser. No. 693,515
17 Claims. (Cl. 260—77.5)

This invention relates to polyhydroxy polyurethane resins (referred to hereinafter as polyhydroxyurethanes), to such resins further modified by reaction with polyfunctional reagents reactive toward hydroxyl groups, and to processes for making and modifying such resins.

For many purposes, the presence of hydroxyl groups in polyurethane resins is highly desirable. Thus, they may be used as reactive centers through which the resins may be cross-linked or otherwise modified through reaction with a suitable reagent. Without further reaction, they confer desirable properties on the resins, such as rendering them more hydrophilic, more compatible with other materials, and more effective as softeners, plasticizers and the like for cellulosic materials such as paper and cellophane and for textiles.

While polyurethanes constitute a well known and valuable class of resins, the sole practical method heretofore known for their preparation precluded the presence of hydroxyl groups except as terminal groups on the polymer molecules. This limitation arose from the fact that the polyisocyanate reagent used in making the polymer reacted with any available hydroxyl groups.

It is, therefore, an object of this invention to provide polyurethane resins wherein substantially each repeating unit of the polymer bears two hydroxyl groups. A further object is to provide polyhydroxy polyurethane resins that have been modified by reaction with a polyfunctional hydroxyl-reacting reagent. Still another object is to provide processes for making the above-described resins. Other objects will appear hereinafter.

According to the invention, polyhydroxy polyurethanes are made by the condensation of (a) a poly(vicinal alkylene carbonate) compound, that is, a compound containing at least two

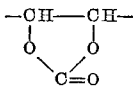

groups, hereinafter referred to as bis-carbonate, with (b) an aliphatic polyamine wherein at least two amino groups are either primary or secondary. In such a condensation, the dioxolane rings are opened, thereby forming urethane and hydroxyl groups. This may be illustrated by the reaction of n molecules of glycol 1,2-bis-(2,3-carbonatopropyl) ether with $n+1$ molecules of ethylenediamine:

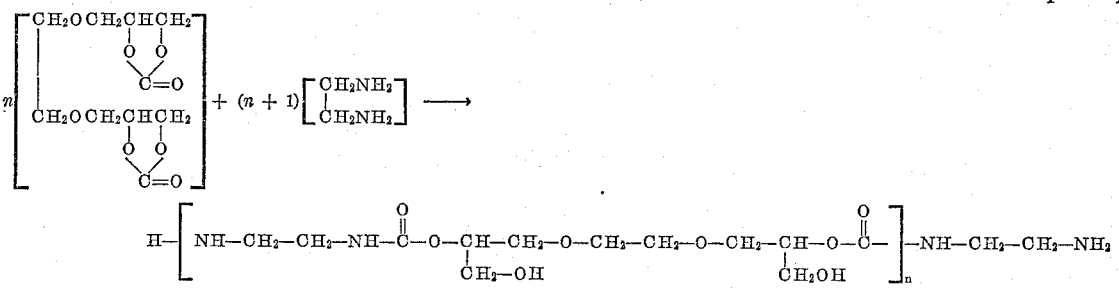

Since a molar excess of amine was used, the terminal groups are amino. Obviously, by use of an excess of bis-carbonate, terminal carbonate groups could be obtained.

Instead of the bis-carbonate shown in the above equation, we can use any bis-carbonate. Since the cyclic carbonate groups characteristic of the bis-carbonates are most conveniently prepared by the reaction of carbon dioxide with the corresponding epoxide, and since epichlorohydrin is a particularly suitable epoxide for use as a starting material, the preferred bis-carbonates are those containing two 2,3-carbonatopropoxy groups. Such bis-carbonates may be prepared by at least two convenient routes as follows:

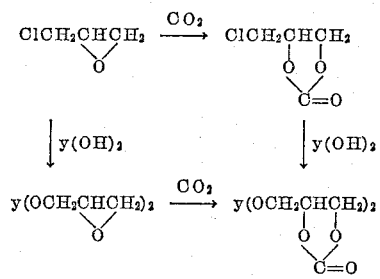

wherein $y(OH)_2$ is a polyhydroxy compound.

Such reactions are well known in the art. The carbonation of epoxides to form carbonates is usually catalyzed by a base and may be conducted, for instance as described in U.S. Patent 2,773,881 or 2,773,070. The condensation of epichlorohydrin with hydroxy compounds is usually facilitated by the use of at least one equivalent of alkali metal or the hydroxide thereof.

A great variety of polyhydroxy compounds are suitable for use as the reactant $y(OH)_2$ in the above equations. These include the alkylene glycols, such as ethylene glycol, 1,2- and 1,3-propylene glycols, 1,2-, 1,3-, 1,4-, and 2,3-butylene glycols, the pentanediols hexanediols and higher alkylene glycols; the polyoxyalkylene glycols such as diethylene glycol, triethylene glycol, higher polyoxyethylene glycols and the analogous propylene glycol, butylene glycol and glycerol chlorohydrin polymers; the triols, such as glycerol and its higher homologs; pentaerythritol and its dimer, trimer and higher polymers; the pentose and hexose sugars, such as xylose, glucose, mannose and fructose; the disaccharides, such as sucrose, maltose and lactose; polyhydric phenols, such as resorcinol, hydroquinone, pyrogallol and phloroglucinol; bis-phenols and alkylene bis-phenols, particularly, bisphenol A, novolacs and similar soluble condensates of aldehydes or ketones with phenols; and in general, compounds containing a plurality of alcoholic and/or phenolic hydroxyl groups.

The polyamine used in the production of the new hydroxyurethane resins may be any amine containing in its molecule at least two aliphatic amino groups in which the nitrogen atom bears at least one hydrogen atom; that is, the amine must contain at least two aliphatic primary or secondary amino groups. Aromatic amino groups may be present but are inert in the resin-forming reaction. Suitable amines include the alkylene-diamines, such as ethylene diamine, propylenediamine, trimethylenediamine pentamethylenediamine and higher polymethylenediamines; polyalkylenepolyamines, such as diethylenetriamine; triethylenetetramine tetraethylenepentamine; dipropylenetriamine, tripropylenetetramine, tetrapropylenepentamine, and higher polyalkylenepolyamines; oxybispropylamine; arylenebisalkylamines, such as xylylenediamines, 2,3,4,6-tetrachloro-1,6-bis-(aminoalkyl)benzenes and bis(2-aminopropyl)benzene; 2,3,5,6-tetrachloro-1,4-xylylene-bis-(3-aminopropyl) ether, and the like.

The condensation reaction between the bis-carbonate and the polyamine may be effected under a wide variety of conditions. Thus, the two reactants may be simply mixed at ordinary temperatures. The molar ratio in which they are mixed may be varied widely, though we generally prefer one in the range of about 1:3 to 3:1. They will react almost immediately to form an initial condensate which then gradually reacts further over a period of hours or days at ordinary temperatures or over a much shorter period at an elevated temperature below that at which decomposition or discoloration occurs. In general, temperatures up to about 200° C. are suitable.

Alternatively, one or both reactants may be dissolved in a suitable inert organic solvent and the condensation conducted in such solvent. The lower aliphatic ketones, esters and ethers and the common aromatic hydrocarbon solvents are suitable. The resins formed in the condensation may be insoluble in such solvents and hence separate from the solvent as they are formed.

If each reactant is bifunctional, the resin obtained by their condensation is linear in structure, the molecular weight being largely dependent on the mole ratio of reactants used. The terminal groups will be derived from whichever reactant is used in molar excess and the highest attainable molecular weight is obtained when the two reactants are used in exactly equivalent amounts. If it is desired to arbitrarily hold down the molecular weight, or if particular end-groups are desired, a molar excess of either reactant may be used or a small proportion of mono-functional carbonate or amine reactant may be used to replace a corresponding amount of the bifunctional reactant. Such monofunctional compounds will act as chain stoppers and thus produce resins having lower molecular weight and containing polymer chains terminating in the monofunctional group.

In a preferred process, the bis-carbonate and the diamine, either with or without solvent, are mixed, and a partial condensation thereby effected, at about ordinary room temperature; the resulting polymer is then molded, applied as a surface coating, or otherwise fabricated; and finally the condensation is completed, either by the application of external heat or by the mere passage of time.

The bis-carbonates used in practicing the invention may be prepared by the method described in the copending application of William A. Rogers, Jr., et al., Serial No. 614,051, filed October 5, 1956. Many suitable amines are known and others are readily prepared by obvious known methods.

A particularly valuable property of the polymers of the invention is that the linear, soluble resins formed from the condensation of a bis-carbonate with a diamine can be cross-linked, and thereby hardened and insolubilized by treatment with a polyfunctional compound that readily reacts with amino, amido or alcoholic hydroxyl groups. Suitable such compounds include alkyl or aryl diisocyanates, thionyl chloride, sulfuryl chloride, aldehydes, especially formaldehyde, and bibasic acid chlorides such as oxalyl chloride, succinyl chloride, adipyl chloride, phthalyl chloride, and the like. Only a very minor amount of these modifying agents is required to produce a profound change in the properties of the polymers treated therewith. Ordinarily they are used at the rate of about 0.1 to 10 percent by weight, based on the resin used, though it is sometimes desirable to use more. These reactions proceed readily under the same conditions as are used in the resin-forming reaction; i.e., at temperatures of about 30 to 200° C., though those in which acid chlorides are used may be conducted at even lower temperatures.

The practice of the invention is illustrated by the following examples.

*Example 1*

50 grams of 1,3-bis(2,3-carbonatopropoxy)-2-propanol, the preparation of which is described in the copending application of William A. Rogers, Jr., et al., filed October 5, 1956, Serial No. 614,051, was rapidly and thoroughly mixed with 16 grams of diethylenetriamine. This mixture was then poured into a mold to form a bar of resin ½ inch x ½ inch x 8 inches. The mixture was cured for 18 hours at 90° C. An amber colored, hard resin resulted which had the following physical properties:

Rockwell hardness=R–120
Barcol hardness=30
Heat distortion=50° C. (123° F.)
Izod impact=10.2 inch-lbs.
Compression strength=15,000 p.s.i.
Tensile strength=6,850 p.s.i.

Barcol hardness after 24 hours was zero, due to absorption of moisture on the surface. The Rockwell hardness remained unchanged. By treatment of the surface with thionyl chloride, the Barcol hardness was increased to 50 and compression strength to 20,000 p.s.i.

*Example 2*

25 grams of 1,3-bis(2,3-carbonatopropoxy)-2-propanol was mixed with 5 ml. of methyl ethyl ketone solvent and separately 9 grams of diethylenetriamine was mixed with 5 ml. of methyl ethyl ketone. The two solutions were mixed thoroughly and spread with a Gardner film spreader on a steel plate to form films 3 mm. thick. The films were dried for 18 hours and cured at 95° C. for five hours. The films had a Sward hardness of 0 to 2 and an impact hardness of 24. They passed the mandrel ⅛" bending test showing good flexibility and adhesion.

These films readily dissolved in water or dilute acid or base, but were insoluble in 30 percent caustic as well as in organic solvents.

*Example 3*

100 grams of 1,3 bis(2,3-carbonatopropoxy)-2-propanol was suspended in 200 ml. of water and 32 grams of diethylenetriamine was slowly added with vigorous stirring. Maximum temperature rise was 60° C. The temperature was maintained at 60° C. for 30 minutes.

The resulting viscous solution of water-soluble polymer was spread on the inside of a glass Petri dish and allowed to dry. A smooth, hard, clear, yellow film remained.

*Example 4*

The bis-carbonate used in this example, 2,3-bis-(2,3-carbonatopropoxy)1,4-dioxane was prepared from the reaction of 2,3-dichlorodioxane and 2,3-carbonatopropanol, as is more fully described in the copending application of Arthur E. Gurgiolo et al., filed October 31, 1957, Serial No. 693,556. 79 grams of this material was dissolved in 200 ml. of chlorobenzene and heated to 105° C. 26 grams of diethylenetriamine was added rapidly and stirring continued. The temperature was raised to 135° C., whereupon the polymer separated as a viscous syrup. After two hours at 135°, a brittle yellow resin, insoluble in the solvent, was obtained which possessed fiber-forming properties. The resin had a softening point of 45° C., but could not be drawn out into strands until a temperature of 120° C. was reached. The polymer readily dissolved in water.

*Example 5*

64 grams of the bis-carbonate used in Example 4 was added to 23 grams anhydrous hexamethylenediamine in 200 ml. of chlorobenzene and reacted for 1 hour at 120° C. The chlorobenzene was decanted from the bottom layer of insoluble resin and the resin removed and freed from residual solvent. An opaque, hard, brittle resin resulted. The resin was insoluble in water, although softened by it, and was insoluble in isopropanol. However, it readily dissolved in a 50–50 isopropanol-water mixture.

Upon being heated, the resin progressively softened from 45 to 200° C., but did not discolor even at 200° C. Upon being cooled, a hard, clear resin was obtained.

*Example 6*

The bis-carbonate used in this example, bis(2,3-carbonatopropyl)2,4-toluenedicarbamate was prepared by the reaction of 2,4-toluenediisocyanate and 2,3-carbonatopropanol. 0.25 mole of this material in dioxane solution was added over 30 minutes to 37 grams (0.50 mole) of propylenediamine. When the exothermic reaction had subsided, the solution was held at 60–70° C. for 30 minutes by heating. The solvent was partially removed by distillation. The residue was then dried in an oven at 110° C., giving a hard, brittle solid, M.P. 75–88° C. At 180° C. the material evolved a gas. A mixture of the solid and tolylene diisocyanate when heated and stirred reacted to form a hard, tough, resinous product.

*Example 7*

To a dioxane solution of the bis-carbonate material shown in Example 6, and containing 0.25 mole of bis-carbonate, was added 30 grams (0.50 mole) of ethylenediamine over a 30 minute period. After a further 30 minutes of reaction at 70° C., the solvent was removed by distillation, leaving a hard, yellow, brittle, solid polymer.

*Example 8*

To a dioxane solution containing 0.25 mole of the bis-carbonate used in Example 6 was added 72.5 grams of an 80 percent aqueous solution of hexamethylenediamine. After the exothermic reaction was over, the solvent was partially removed by distillation. The gummy residue was mixed with ⅓ its weight of tolylene diisocyanate. Upon being heated, the mixture became homogeneous and the solution was converted to a hard, tough, foamed product.

*Example 9*

Polyepichlorohydrin of average molecular weight 1150 was converted to the diglycidyl ether of polyepichlorohydrin by treatment with caustic. The diglycidyl ether was converted to the bis(2,3-carbonatopropyl ether) by treatment with carbon dioxide, by the processes described in U.S. Patents 2,773,070 and 2,773,881 and in the above cited applications of William A. Rogers et al. and Arthur E. Gurgiolo et al. The resulting dicarbonate is a thick, viscous syrup. To 100 grams of this bis(2,3-carbonatopropyl ether) of polyepichlorohydrin was added 10 grams of diethylenetriamine which is the stoichiometric amount. The mixture was thoroughly mixed and poured into ½ inch x ½ inch x 8 inch stick molds and cured at 120° C. for 18 hours.

The resultant transparent resin was highly flexible and could be stretched 200 percent. It had a Shore hardness of 70 and an Izod impact of 82 inch-lbs.

*Example 10*

To 150 grams of the bis-carbonate used in Example 9 was added 15 grams of diethylenetriamine. The mixture was thoroughly agitated and cast into a flat sheet .025 inch thick, 8¾ inches long and 7 inches wide, by use of an appropriate mold. After being cured at 120° C. for 18 hours, a clear, amber, rubbery, flexible sheet was obtained. It had an elongation of 200 percent and a tensile strength of 180 p.s.i.

*Example 11*

To 280 grams of the same bis-carbonate used in Example 9 was added 56 grams of diethylenetriamine representing 2½ times the stoichiometric amount of amine required. After being thoroughly mixed, the material was cast into sticks, ½ inch x ½ inch x 8 inches and cured 18 hours at 120° C. There resulted a very hard and rigid, clear, amber resin. It is believed that the excess amine reacted with some of the chlorine groups of the polyepichlorohydrin to produce secondary and tertiary amine hydrochloride structures and that the resulting highly cross-linked structure caused the rigidity of this polymer.

The following properties were obtained:

Rockwell hardness=B 90
Barcol hardness=30
Heat distortion=127° F. (52° C.)
Ultimate flexural strength=11,300 p.s.i.
Compression yield strength=12,000 p.s.i.
Tensile strength=6,000 p.s.i.
Izod impact=6.5 inch-lbs.

*Example 12*

Thirty grams of the bis(2,3-carbonatopropoxy ether) of polyepichlorohydrin used in Example 9 and 2.5 grams of 1,4-butanediamine were thoroughly mixed. The resulting syrup was cast into 1½ inch x 1½ inch x 8 inch sticks and cured at 120° C. for 18 hours. A soft elastic brown resin resulted. The resin could be pulled to 200 percent elongation. Upon removing the stress it slowly returned to its original size and shape. The material did not melt but became more and more rubbery as the temperature was raised. Only above 200° C. was any sign of slow decomposition evident.

*Example 13*

The bis-carbonate used in this example was prepared by the reaction of $CO_2$ with the diglycidyl ether of polyepichlorohydrin having an average molecular weight of 1250. The resulting bis-carbonate was a thick, viscous syrup. To 33.3 grams of this bis(2,3-carbonatopropyl ether) of polyepichlorohydrin was added 4.4 grams of meta-xylylenediamine. The mixture was agitated and poured into a ½ inch x ½ inch x 8 inch stick mold and allowed to react at 25° C. for 4 hours. It was then cured at 110° C. for 16 hours. The resulting polymer was tough and flexible, would not break upon 200 percent elongation and was clear with a slightly amber color. It showed a Shore hardness of 38 and was insoluble in hot water, though softened by it.

*Example 14*

33.3 grams of 1,3-bis(2,3-carbonatopropoxy)-2-propanol was mixed with 5 grams of meta-xylylenediamine and allowed to react for 4 hours at 25° C. The resulting polymer was then cured for 16 hours at 110° C. to produce a clear yellow, soft, plastic polymer which could be pulled into long taffy-like threads. This material was soluble in hot water and acetone.

*Example 15*

A solution of polyhydroxyurethane containing 40 percent solids was made by dispersing 300 grams of 1,3-bis(2,3-carbonatopropoxy)-2-propanol in 600 ml. of water and adding thereto 96 grams of diethylenetriamine. Maximum temperature rise was to 50° C. After stirring one hour, the solution was filtered and diluted with 1000 ml. of water.

76 grams of 37 percent formaldehyde solution was added. A mildly exothermic reaction occurred. The resulting light amber solution was diluted to 1200 ml. containing 35 percent solids.

This solution was coated on a glass plate and the film dried at 123° C. overnight. A clear, yellow, adherent film resulted. It had a Sward rocker hardness of 10 percent.

Example 16

A solution of polyhydroxyurethane was made by dispersing 300 grams of 1,3-bis(2,3-carbonatopropoxy)-2-propanol in 600 ml. of water and adding thereto 189 grams of tetraethylenepentamine. The maximum temperature due to the exothermic reaction was 56° C. After complete reaction the solution was filtered free of a small amount of solids. 130 ml. of 37 percent formaldehyde was added. A maximum tmperature rise of 39° C. resulted upon adding the formaldehyde. The solution became very viscous and syrupy although it did not gel. The solution was diluted to 2150 ml. to reduce the viscosity and to reduce the solids content to 25 percent.

A film of this solution was cast on a steel plate and cured at 120° C. for 2 hours. The film had an impact strength of 28 and had good adhesion and flexibility as indicated by passing the mandrel ⅛″ bending test. The film was insoluble in hot water.

When instead of the formaldehyde used in Examples 15 and 16 some other mono-aldehyde such as acetaldehyde, propionaldehyde, furfural or benzaldehyde is used, a similar but usually less vigorous reaction occurs and an insoluble resin is formed. When a dialdehyde such as glyoxal or one of its homologs, is used, a stronger cross-linking action is obtained and a gelled, insoluble resin is produced. Even faster and stronger cross-linking agents are the diisocyanates and dibasic acid chlorides. These react vigorously with the polyhydroxyurethanes, especially those derived from polyalkylenepolyamines, to form highly cross-linked products.

We claim:

1. A polyhydroxy polyurethane resin produced by reacting by contacting at about 30–200° C. an aliphatic polyamine, wherein at least two amino nitrogen atoms bear at least one hydrogen atom each, and about ⅓ to 3 molar proportions, based on the amine, of a carbonate having the formula

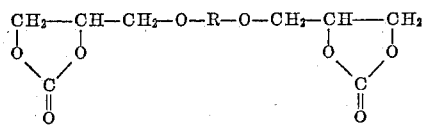

wherein R is a a divalent radical selected from the group consisting of radicals having one of the formulas

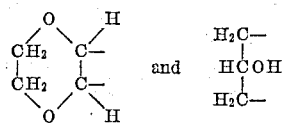

and the radical formed by removal of the hydroxyl groups from polyepichlorohydrin.

2. A cross-linked, insoluble resin made by reacting by contacting the resin defined in claim 1 with a poly-functional reactant selected from the group consisting of aldehydes, dicarboxylic acid chlorides, thionyl chloride and sulfuryl chloride, said contacting being at a temperature and for a time sufficient to effect substantial cross-linking and insolubilization of the resin.

3. A cross-linked, infusible resin made by reacting by contacting the resin defined in claim 1 with about 0.1 to 10% by weight, based on the latter resin, of an aldehyde.

4. A resin as defined in claim 3 wherein the aldehyde is formaldehyde.

5. A cross-linked, insoluble resin made by (1) reacting by contacting at about 30–200° C. an aliphatic polyamine wherein at least two amino nitrogen atoms bear at least one hydrogen atom each with about ⅓ to 3 molar proportions, based on the amine, of 1,3-bis(2,3-carbonatopropoxy)-2-propanol and (2) further reacting by contacting at about 30–200° C. the thus formed resin with about 0.1 to 10%, by weight, based on the resin, of formaldehyde.

6. The resin defined in claim 5 wherein the polyamine is diethylenetriamine.

7. The resin defined in claim 5 wherein the polyamine is tetraethylene pentamine.

8. A product as defined in claim 1 wherein the carbonato compound is 1,3-bis(2,3-carbonatopropoxy)-2-propanol.

9. A product as defined in claim 1 wherein the carbonato compound is 2,3-bis(2,3-carbonatopropoxy)-1,4-dioxane.

10. A product as defined in claim 1 wherein the carbonato compound is a bis(2,3-carbonatopropyl ether) of polyepichlorohydrin.

11. A product as defined in claim 1 wherein the polyamine is an alkylenediamine.

12. A product as defined in claim 11 wherein the alkylenediamine is ethylene diamine.

13. A product as defined in claim 11 wherein the alkylenediamine is 1,3-propylenediamine.

14. A product as defined in claim 11 wherein the alkylenediamine is 1,4-butylenediamine.

15. A product as defined in claim 11 wherein the alkylenediamine is 1,6-hexylenediamine.

16. A product as defined in claim 1 where in the polyamine is a polyalkylenepolyamine.

17. A composition as defined in claim 16 wherein the polyalkylenepolyamine is diethylenetriamine.

References Cited in the file of this patent

UNITED STATES PATENTS

| | | |
|---|---|---|
| 2,456,443 | Mueller et al. | Dec. 14, 1948 |
| 2,518,440 | Joyce | Aug. 15, 1950 |
| 2,522,680 | Kropa | Sept. 19, 1950 |
| 2,802,022 | Groszos et al. | Aug. 6, 1957 |

FOREIGN PATENTS

| | | |
|---|---|---|
| 109,064 | Sweden | Nov. 16, 1943 |